(12) United States Patent
Chang et al.

(10) Patent No.: US 7,908,175 B2
(45) Date of Patent: Mar. 15, 2011

(54) METHODS, SYSTEMS, AND COMPUTER PROGRAM PRODUCTS THAT FACILITATE AND ENHANCE PERSONAL SHOPPING

(75) Inventors: E-Lee Chang, Mableton, GA (US); Shiejye Geoffrey Lin, Atlanta, GA (US); Sharon Evelyn Carter, Austell, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 409 days.

(21) Appl. No.: 11/512,958

(22) Filed: Aug. 29, 2006

(65) Prior Publication Data
US 2008/0059323 A1 Mar. 6, 2008

(51) Int. Cl.
*G06Q 30/00* (2006.01)
(52) U.S. Cl. .................................... 705/26
(58) Field of Classification Search ............ 705/26, 705/27
See application file for complete search history.

(56) References Cited

U.S. PATENT DOCUMENTS

| | | | |
|---|---|---|---|
| 2002/0152123 A1* | 10/2002 | Giordano et al. | 705/14 |
| 2003/0158796 A1* | 8/2003 | Balent | 705/28 |
| 2003/0200152 A1* | 10/2003 | Divekar | 705/26 |
| 2004/0138989 A1* | 7/2004 | O'Malley et al. | 705/37 |
| 2007/0136140 A1* | 6/2007 | Smith | 705/26 |
| 2008/0235096 A1* | 9/2008 | Owens | 705/14 |
| 2008/0255930 A1* | 10/2008 | Cope et al. | 705/10 |

* cited by examiner

*Primary Examiner* — Mila Airapetian
(74) *Attorney, Agent, or Firm* — Myers Bigel Sibley & Sajovec, P.A.

(57) ABSTRACT

Methods, systems, and computer program products that facilitate personal shopping are provided. A shopping list is generated for a customer via a personal shopping system connected to a communications network. The shopping list identifies one or more products the customer wants to purchase. The personal shopping system includes a product usage repository that contains customer information for each of a plurality of customers, including information about products previously purchased by each customer. The shopping list is transmitted to one or more product providers via the communications network with a request for information about each product on the shopping list. Product information is received for each item on the shopping list from one or more product providers via the communications network and communicated to the customer via the communications network.

5 Claims, 7 Drawing Sheets

| Delete | Brand | Product Name and size | Product ID/SKU/Bar Code | Quantity | Earliest Expir. Date | | Max Pay Price | Advanced Options |
|---|---|---|---|---|---|---|---|---|
| ☐ | My Favorite | Half and Half creamer | xxxxdddddddd | 3 | 8/30/06 | Calendar | $1.50/lb | Edit |
| ☐ | My Kid's Favorite | Scooby Snacks | ddddxxxxxxxx | 2 | 9/4/04 | Calendar | $4.75 | Edit |
| ☐ | Sugar unlimited | Sugar smack candy bombs | xxxxxxxx | 1 | | Calendar | | Edit |
| ☐ | | | | | | Calendar | | Edit |
| ☑ | | | | | | Calendar | | Edit |
| ☑ | | | | | | Calendar | | Edit |
| ☐ | | | | | | Calendar | | Edit |
| ☐ | | | | | | Calendar | | Edit |

[ Save ]     [ Send to Merchant ]

*Fig. 6*

| Delete | Brand | Product Name | Product ID/SKU/Bar Code | Quantity | Qty Avail | Earliest Expir. Date | Actual Expir. Date | Max Pay Price | Found Price |
|---|---|---|---|---|---|---|---|---|---|
| ☐ | My Favorite | Half and Half creamer | xxxxdddddddd | 3 | 3 | 8/30/06 | 9/10/06 | $1.50/lb | $1.34/lb |
| ☐ | My Kid's Favorite | Scooby Snacks | ddddxxxxxxxx | 2 | 1 | 9/4/06 | 8/21/06 | $5.00 | $4.75 |
| ☑ | Sugar unlimited | Sugar smack candy bombs | xxxxxxxx | 1 | 1 | | | | $2.25 |
| ☐ | | | | | | | | | |
| ☐ | | | | | | | | | |
| ☐ | | | | | | | | | |
| ☐ | | | | | | | | | |
| ☐ | | | | | | | | | |
| ☐ | | | | | | | | | |

[ Edit List ] [ Delete Selected ] [ Re-send to Merchant ] [ Purchase All ] [ Purchase All Green Only ]

*Fig. 7*

METHODS, SYSTEMS, AND COMPUTER PROGRAM PRODUCTS THAT FACILITATE AND ENHANCE PERSONAL SHOPPING

FIELD OF THE INVENTION

The present invention relates generally to shopping and, more particularly, to shopping methods, systems, and computer program products.

BACKGROUND OF THE INVENTION

With increasingly busy schedules, many consumers wish to expend less time on relatively mundane and repetitive tasks, such as shopping. Unfortunately, shopping can be a very time-consuming task. For many consumers, shopping is still performed the way it has been for decades. For example, when buying groceries, a consumer typically composes a list of items to purchase (either mentally or manually), drives to the grocery store, selects the items, waits in line to purchase the selected items, pays for the items, loads the purchased items into the car, and then drives home. Moreover, when selecting items in a store, consumers often check expiration dates, compare pricing, and check for coupons or sales, which adds to the time required to complete the task. Moreover, if a store is out of certain items, a consumer may have to drive to another store. Thus, the entire shopping experience can be very time-consuming and inefficient.

Shopping via Internet-based web sites has been available for some time. These retail web sites allow consumers to select and purchase for delivery, or pick up, items offered by retailers. The user experience, however, may be less than optimal. Some retail web sites utilize cumbersome and rigidly structured hierarchical menus to select items for purchase. This approach is counter to the way many consumers approach shopping, particularly grocery shopping. In addition, some retail web sites may not allow consumers to price-compare similar items between stores, thus making it difficult to decide where to shop. In addition consumers often wish to price-compare brands in the same store quickly, a feature traditionally not provided.

On-line auction web sites, such as Priceline.com, allow consumers to bid for items at various retail stores. However, when comparing prices online before making a purchase, a consumer typically has to go to multiple web sites to obtain pricing information or typically has to use multiple search engines. Similarly, when submitting bids, a consumer may not receive the item of choice or may have to submit re-bids with changed parameters because the item of choice did not elicit responses from retailers. These shopping methods can be very time consuming, as well.

Previous forays into enhanced shopping have allowed users to submit shopping orders and request grocery delivery in non-traditional manners (e.g., WebVan, Publix on-line shopping), but in each case users were limited to the inventory from a single vendor or chain of stores.

As such, there is a need for improved on-line shopping methods that can improve on traditional retail web sites by: exploiting currently-available technologies, more efficiently using consumers' time and input, enhancing consumer control over their shopping experience, expanding product searches across multiple vendors, and automating repetitive shopping tasks,

SUMMARY OF THE INVENTION

In view of the above discussion, methods, systems, and computer program products that facilitate and reduce the time associated with shopping are provided. According to some embodiments of the present invention, a method of facilitating personal shopping includes generating a shopping list for a customer via a personal shopping system connected to a communications network, wherein the shopping list identifies one or more products the customer wants to purchase, wherein the personal shopping system includes a product usage repository that contains customer information for each of a plurality of customers, and wherein customer information includes information about products previously purchased by each customer; transmitting the shopping list to one or more product providers via the communications network with a request for information about each product on the shopping list; receiving product information for each item on the shopping list from one or more product providers via the communications network; and communicating the received product information to the customer via the communications network. The request for information may be a request for various information including, but not limited to, product availability, product price, product location, etc.

According to some embodiments of the present invention, generating a shopping list includes automatically generating the shopping list as products are consumed by the customer.

According to some embodiments of the present invention, a shopping list is generated in response to a customer entering product identification information into a device (e.g., a cell phone, personal computer, PDA, internet video devices, WebTVs etc.) that is in communication with a communications network.

According to some embodiments of the present invention, a shopping list is generated in response to a customer scanning a barcode associated with a product via a scanning device that is in communication with a communications network.

According to some embodiments of the present invention, a shopping list is generated in response to detecting an RFID tag identifier associated with a product via an RF antenna in communication with a communications network.

According to some embodiments of the present invention, a shopping list is generated in response to a customer selecting or entering purchasing rules or logic via a display screen of a device (e.g., a computer display, WebTV, etc.) that is in communication with a communications network.

According to some embodiments of the present invention, a shopping list is generated in response to a customer selecting a product displayed within a display screen of a device (e.g., a computer display, WebTV, etc.) that is in communication with a communications network.

According to some embodiments of the present invention, a shopping list can be updated by a customer by editing the list contents and/or the purchasing decision rules via a display screen of a device (e.g., a computer display, WebTV, etc.) that is in communication with a communications network.

According to some embodiments of the present invention, a method of facilitating personal shopping includes entering information associated with a product into a device that is in communication with a communications network; transmitting the product information to a personal shopping system connected to the communications network; and receiving an indication at the device from the personal shopping system as to whether customer inventory for the product is below a threshold level. Information may be entered into various types of devices (e.g., cell phone, personal computer, PDA, etc.) and in various types of ways including, but not limited to, typing a product identification into a device, scanning a barcode associated with the product via the device, and/or detecting an RFID tag identifier associated with the product via an RF antenna associated with the device.

According to some embodiments of the present invention, a personal shopping system that facilitates personal shopping includes a product usage repository that contains customer information for each of a plurality of customers; software code for generating a shopping list for a customer, wherein the shopping list identifies one or more products the customer wants to purchase; software code for transmitting the shopping list to one or more product providers via the communications network with a request for information about each product on the shopping list; software code for receiving product information for each item on the shopping list from one or more product providers via the communications network; and software code for communicating the received product information to the customer via the communications network.

According to some embodiments of the present invention, a shopping list is generated or updated in response to a customer selecting a specific ingredient or preferred diet plan to include in the list, or to omit from the list (food allergen to be avoided, or other dietary constraint).

According to some embodiments of the present invention, a personal shopping system that facilitates personal shopping includes a product usage repository that contains customer information for each of a plurality of customers; a customer device comprising software code for entering information associated with a product and transmitting entered information to the product usage repository; and software code for receiving an indication at the customer device as to whether customer inventory for the product is below a threshold level.

According to some embodiments of the present invention, a personal shopping system that facilitates personal shopping includes an alerting mechanism that proactively informs the user that a near-future purchase is necessary or particularly advantageous, e.g., inventory for designated list items is critically low, or designated list items are available at a discounted price for a limited time.

According to some embodiments of the present invention, a personal shopping system that includes a component that calculates bills and accepts payment in the standard supported forms (coupons and discounts can be applied, and customer can pay by credit card, gift card, etc.) Various billing methods, payment methods and product delivery methods may utilized in accordance with embodiments of the present invention.

Other methods, systems, and computer program products according to embodiments of the invention will be or become apparent to one with skill in the art upon review of the following drawings and detailed description. It is intended that all such additional methods, computer networks, and computer program products be included within this description, be within the scope of the present invention, and be protected by the accompanying claims.

BRIEF DESCRIPTION OF THE DRAWINGS

FIG. 6 illustrates an exemplary customer view of a shopping list to be submitted to one or more product providers where the customer has set a maximum price that the customer will pay for several of the items, according to some embodiments of the present invention.

FIG. 7 illustrates an exemplary customer view of a shopping list returned by a product provider with product status and with prices that are less than the customer maximum price, according to some embodiments of the present invention.

DETAILED DESCRIPTION OF EMBODIMENTS OF THE INVENTION

Figure 1:
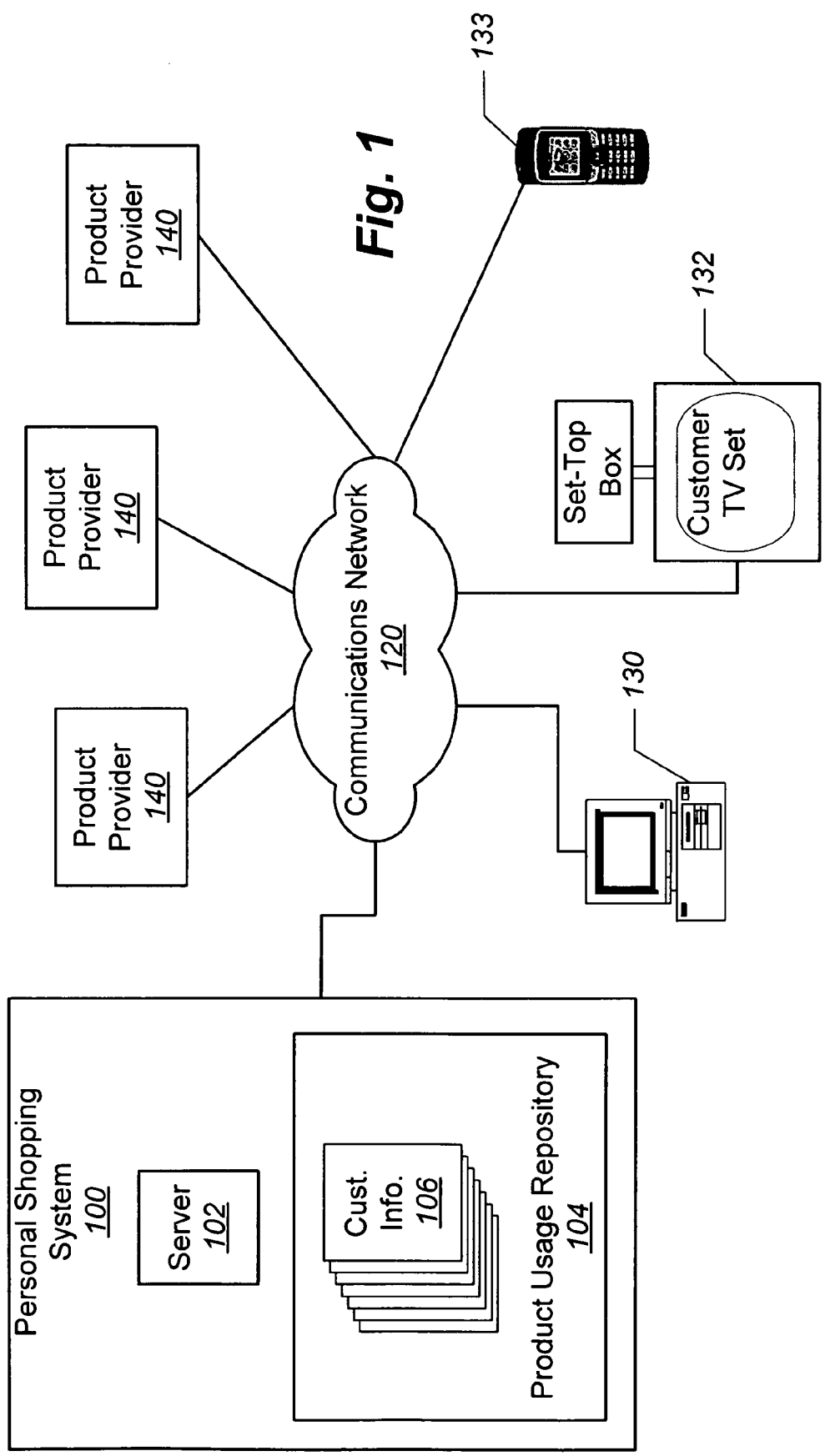
FIG. 1 is a block diagram that illustrates an exemplary personal shopping system connected to a communications network that facilitates personal shopping, according to some embodiments of the present invention.

The present invention now will be described more fully hereinafter with reference to the accompanying drawings, in which illustrated embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein the term "customer" is intended to mean any entity, such as an individual or business, that purchases products and/or services.

As used herein the term "product" is intended to mean any type of product and/or service that a customer purchases.

As used herein the term "product provider" is intended to mean any entity, such as an individual or business that sells products and/or services.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent, with their meaning in the context of the relevant art and will not be interpreted in an idealized or overly formal sense unless expressly so defined herein.

The present invention is preferably practiced within a client/server programming environment. As is known by those skilled in this art, client/server is a model for a relationship between two computer programs in which one program, the client program, makes a service request from another program, the server program, which fulfills the request. Relative to the Internet, a Web browser is a client program that requests services (the sending of Web pages or files) from a Web server (which technically is called a Hypertext Transport Protocol or HTTP server) in another computer somewhere on the Internet.

As is known to those with skill in this art, client/server environments may include public communications networks, such as the Internet, and private communications networks often referred to as "intranets" and "extranets." The term "Internet" shall incorporate the terms "intranet" and "extranet" and any references to the Internet shall be understood to mean a communications network of any type, including intranets and/or extranets.

FIG. 1 illustrates an exemplary personal shopping system 100 connected to a communications network that facilitates personal shopping of remotely located customers, according to some embodiments of the present invention. The illustrated personal shopping system 100 is connected to a communications network 120 (e.g., the Internet, an intranet, etc.). Customers communicate with the personal shopping system 100 via any of a plurality of different types of devices connected to the network 120. Exemplary customer devices may include, but are not limited to, personal computers 130, interactive televisions, such as WebTVs 132, and wireless communications devices 133 (e.g., personal digital assistants (PDAs), hand-held computers, Internet-ready phones, etc.). Customer devices according to some embodiments of the present invention may be directly connected to the communications network 120 (e.g., devices 130, 132) or may communicate with the communications network 120 wirelessly (e.g., device 133). A plurality of product/service providers 140 are connected to the network 120 and communicate with the personal shopping system 100 and with customers as described below.

The illustrated personal shopping system includes a server 102 and a product usage repository 104. Customer information for a plurality of customers utilizing the personal shopping system 100 is stored within the product usage repository. Customer information includes information about products and services that each customer uses, has previously purchased, etc. According to some embodiments of the present invention, customer information may include information about inventory levels of products in each customer's home. For example, customer information may include up-to-date information about how many cans of tomato soup a customer has in his/her home. The server 102 is configured to implement at least the operations described below with respect to FIGS. 3-5.

Figure 2:
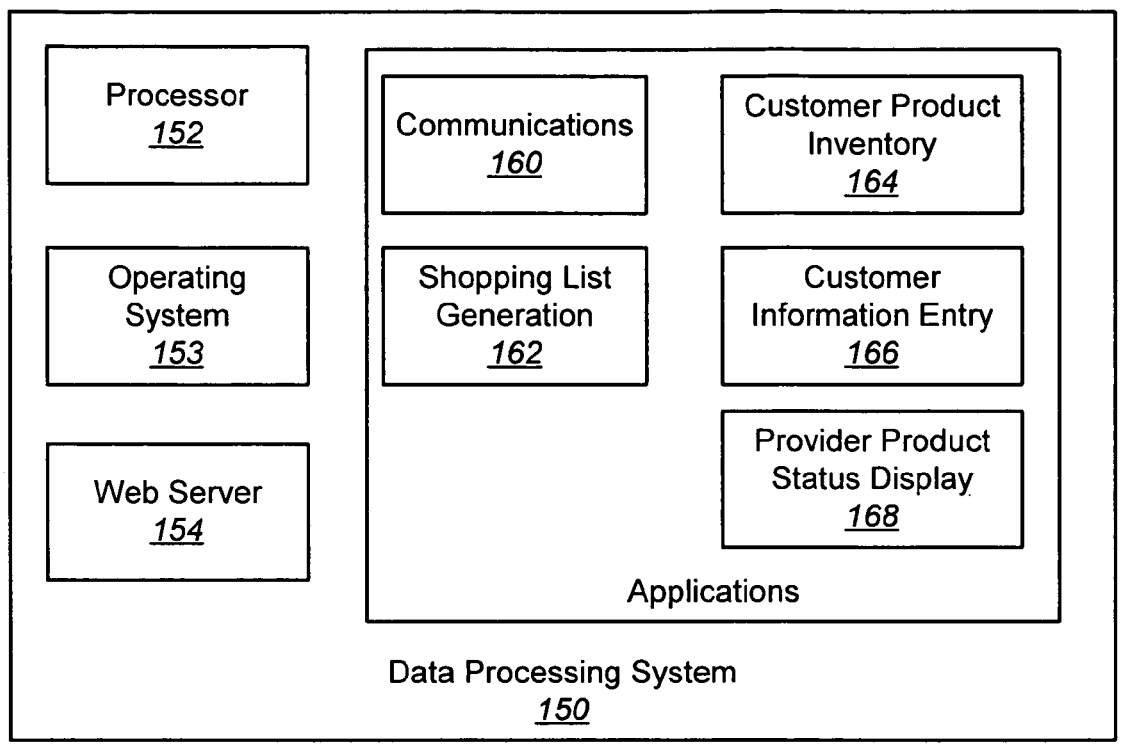
FIG. 2, a block diagram of a data processing system that may be used to implement various operations of the personal shopping system of FIG. 1, according to some embodiments of the present invention.

Referring to FIG. 2, a block diagram of a data processing system 150 that may be used to implement the server 102 (FIG. 1), according to some embodiments of the present invention, is illustrated. The illustrated data processing system 150, includes a processor 152, an operating system 153, a web server 154, and various application programs: communications (e.g., encrypted data communications) 160, shopping list generation 162, customer product inventory 164, customer information entry/management 166 and provider product status display 168. These applications may execute entirely on the server 102 (or on other data processing systems in communication with the server 102), or partly on the server 102 and partly on a customer's device 130, 132, 133 (FIG. 1).

The communications application 160 is configured to handle communications between the personal shopping system 100 and the various customer client devices 130, 132, 133, and is also configured to handle communications between the personal shopping system 100 and the product/service providers 140.

The shopping list generation application 162 is configured to generate a shopping list for a customer and transmit the shopping list to one or more product/service providers 140 with a request for information about each product in the shopping list. The information request may include a request for virtually any type of information associated with a product including, but not limited to, product availability, product price, product location, etc. Shopping list generation may be initiated in various ways including, but not limited to, automatically as products are consumed by a customer, in response to a customer entering product identification information into a device in communication with the communications network 120, in response to scanning a barcode associated with a product via a scanning device in communication with the communications network, in response to detecting an RFID tag identifier associated with the product via an RF antenna in communication with the communications network, in response to selecting a product displayed within a display screen of a device (e.g., a WebTV, etc.) in communication with the communications network 120, etc.

The customer product inventory application 164 is configured to monitor the product inventory of each customer. The customer product inventory application 164 notifies the shopping list generation application 162 when the product inventory for a customer falls below a predetermined threshold. In addition, the customer product inventory application 164 allows a customer to inquire as to product inventory levels. For example, a customer can input a product identification into a device in communication with the network 120 and find out whether the customer is out of the product at home and needs to purchase the product.

The customer information entry application 166 facilitates entering and maintaining customer information within the product usage repository 104. Customer information generated via the customer information entry application 166 is stored in, and retrieved from, one or more databases in communication in the product usage repository 104. However, other data storage technologies may be utilized without limitation. As is known by those of skill in the art, a database is a collection of data that is organized in "tables." A database typically includes a database manager that facilitates accessing, managing, and updating data within the various tables of a database. Exemplary types of databases that can be used as data storage for customer information 106 to implement embodiments of the present invention include, but are not limited to, relational databases, distributed databases (databases that are dispersed or replicated among different points in a network), and object-oriented databases. Relational, distributed, and object-oriented databases are well understood by those of skill in the art and need not be discussed further herein. Exemplary commercial databases that can be used to implement embodiments of the present invention include, but are not limited to, IBM's DB2® database, Microsoft's SQL server database, and other database products, such as those from Oracle, Sybase, and Computer Associates.

The provider product status display application 168 is configured to direct output from product providers 140 back to a customer's device 130, 132, 133. Exemplary output includes, but is not limited to, indications of what product on a shopping list is available, what the price is, etc.

Exemplary data processing systems which may be utilized in accordance with embodiments of the present invention include, but are not limited to, SUN MICROSYSTEMS®, APPLE®, IBM®, and IBM®-compatible personal computers and workstations. However, it is to be understood that various computing devices and processors may be utilized to carry out embodiments of the present invention without being limited to those enumerated herein. Exemplary operating systems 153 may include, but are not limited to, LINUX®, UNIX, WINDOWS 98®, WINDOWS 2000®, WINDOWS XP® and WINDOWS NT® operating systems, and PALM OS® and WINDOWS CE® operating systems for handheld devices.

The web server 154 is configured to handle communications with client devices 130, 132, 133, with product/service providers 140, and any other devices that are in communication with the communications network 120. Web servers are well understood by those of skill in the art, and need not be described further herein. Exemplary web servers that may be utilized in accordance with embodiments of the present invention include Apache, available from the Apache Server Project (www.apache.org); Microsoft's Internet Information Server (IIS), available from Microsoft Corporation, Redmond, Wash.; and Netscape's FastTrack® and Enterprise™ servers, available from America Online, Inc., Dulles, Va. Other Web servers that may be utilized include, but are not limited to, Novell's Web Server for users of its NetWare® operating system, available from Novell, Inc., San Jose, Calif.; and IBM's family of Lotus Domino® servers, available from International Business Machines Corporation, Armonk, N.Y.

Using the task of buying weekly groceries for example, customers who utilize a personal shopping system, according to some embodiments of the present invention, have their personal profile information such as what brand(s) of milk or toothpaste they use (and any associated purchasing decision logic) stored in a product usage repository 104. This product usage repository 104 is supported by the personal shopping system 100 that interconnects various grocery stores to the consumer's home network. When household items are depleted, users inform the personal shopping system 100 of the items they wish to purchase by utilizing various known data entry technologies (e.g., barcode scanning, cell phone, RFID, personal computer, PDA, etc.) or by utilizing some future technology that can automate the input process, and automatically generate a shopping list. Alternatively, users manually generate grocery lists using an input device such as a PDA or intelligent voice recognition system (IVR system) and send the list to various retail stores. Users can also use remote wireless devices such as PDAs and/or cell phones to access the personal shopping system 100 and generate the grocery list to send to the grocery store of choice.

The grocery stores receiving a shopping list use the personal shopping system 100 to send communications back to the customers and inform them, for example, of a price for the products on the shopping list, the location of a store having the products in stock, the current sale prices (e.g., sales of the week, etc.), coupon and/or discount information, when the items will be packaged and readied for pick-up, out-of-stock items, and/or the location of other stores with in-stock requested items. Based on the information received via the personal shopping system 100, consumers can purchase items from their choice of the cheapest, the closest, or their favorite retail store, pay for the items, specify the date and time for the items to be either picked up or delivered, and specify, if the items are to be delivered, who/what service will deliver them (e.g., the product provider, a delivery service such as Federal Express, UPS, DHL, etc.). Thus, the personal shopping system 100 can streamline the shopping process and make it more efficient without eliminating consumers' purchasing freedom.

Moreover, by enabling bidirectional communications between consumers and retail stores, the personal shopping system 100 can reduce the amount of shopping time by allowing consumers to submit a desired list of products automatically or manually, and purchase the products from their choice of the cheapest, the closest, or their favorite retail store, based on the relevant purchasing information received such as price and item availability. The personal shopping system 100 allows consumers to shop, purchase, and choose their receiving method from the comfort of their homes.

The present invention will now be described below with reference to block diagrams and/or flowchart illustrations of methods, apparatus (systems) and computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block diagrams and/or flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block diagrams and/or flowchart block or blocks.

It should be noted that, in some alternative embodiments of the present invention, the functions noted in the blocks may occur out of the order noted in the figures, or not at all. For example, two blocks shown in succession may in fact be executed substantially concurrently or the blocks may sometimes be executed in the reverse order, depending on the functionality involved. Furthermore, in certain embodiments of the present invention, such as object oriented programming embodiments, the sequential nature of the flowcharts may be replaced with an object model such that operations and/or functions may be performed in parallel or sequentially.

Figure 3:
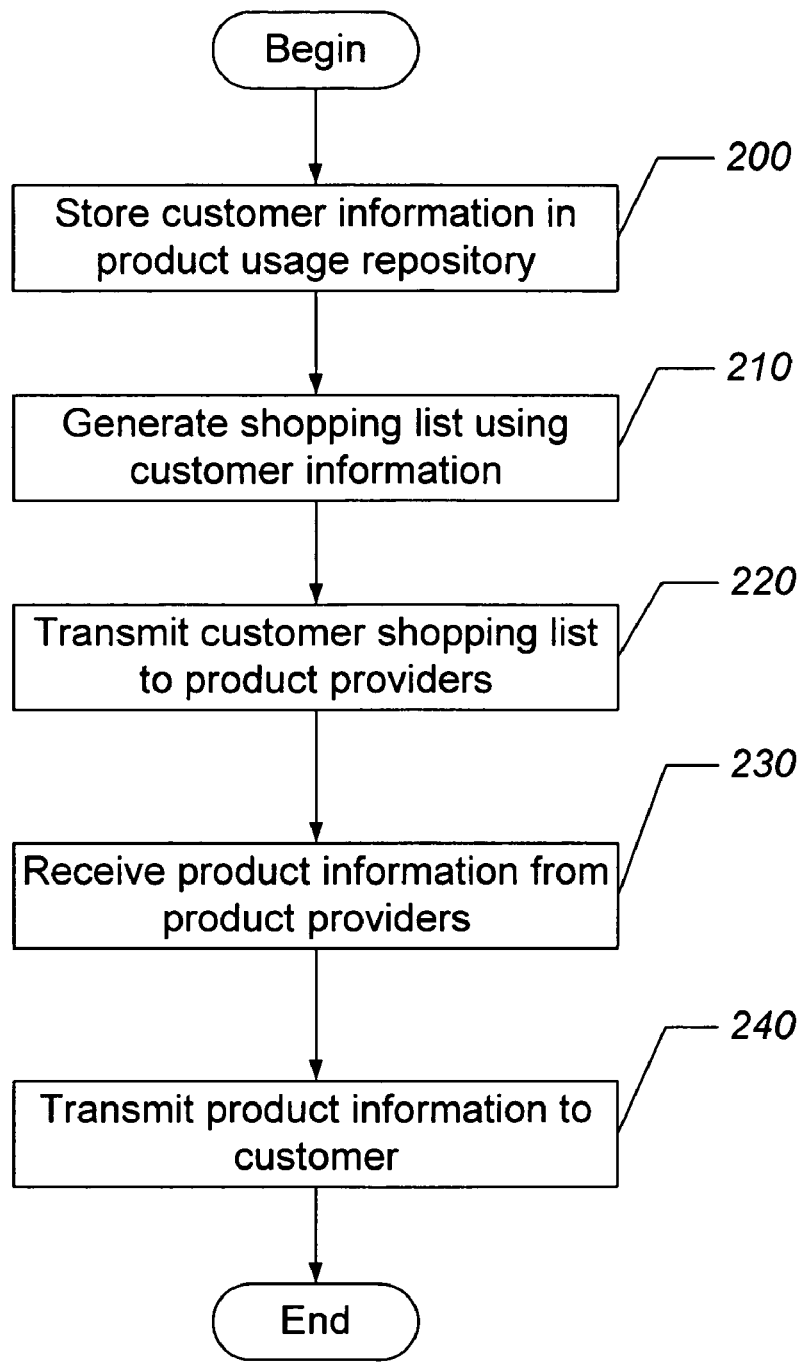
FIGS. 3-5 are flow charts of systems, methods and/or computer program products that facilitate personal shopping, according to some embodiments of the present invention.
Figure 4:
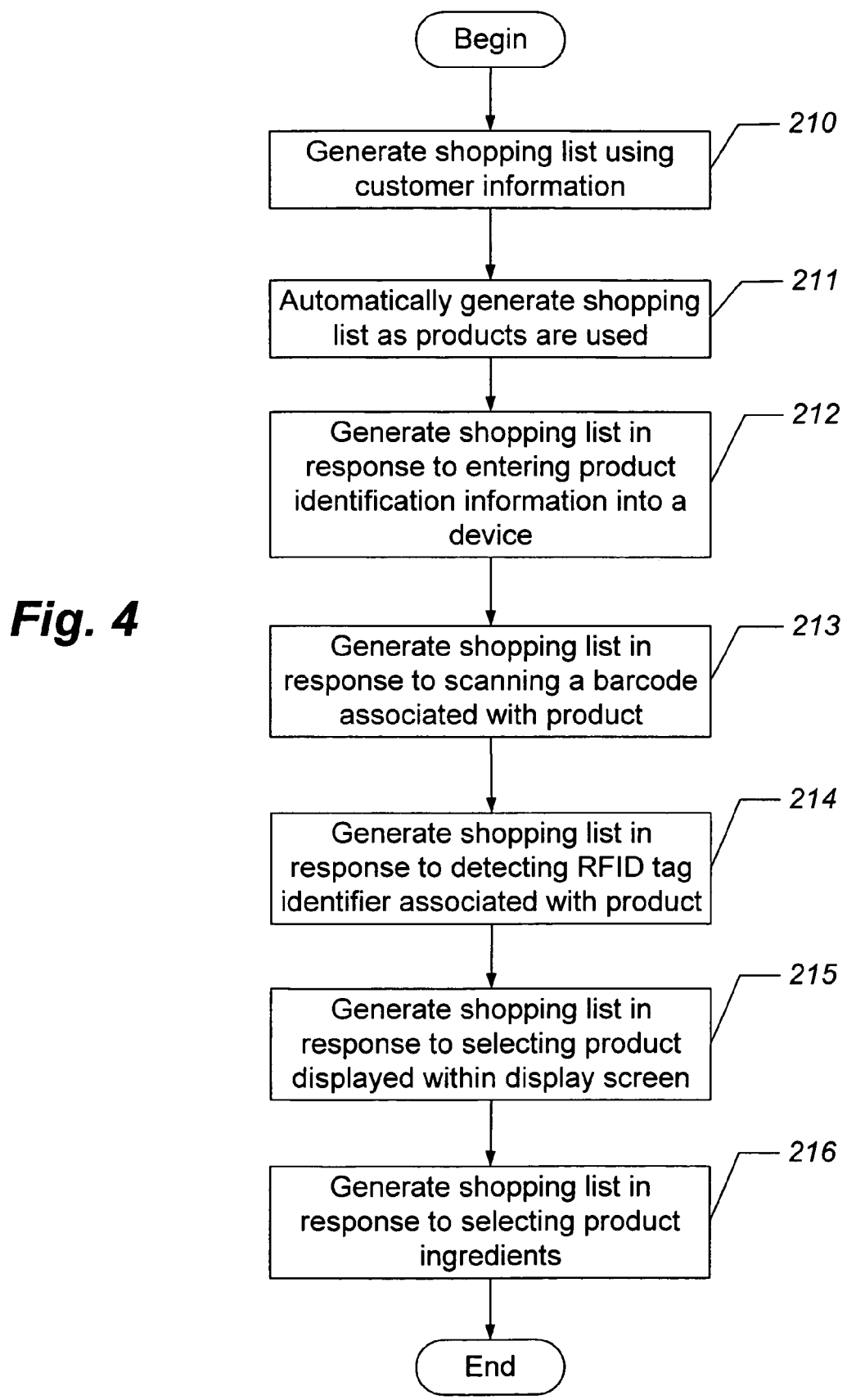
Figure 5:
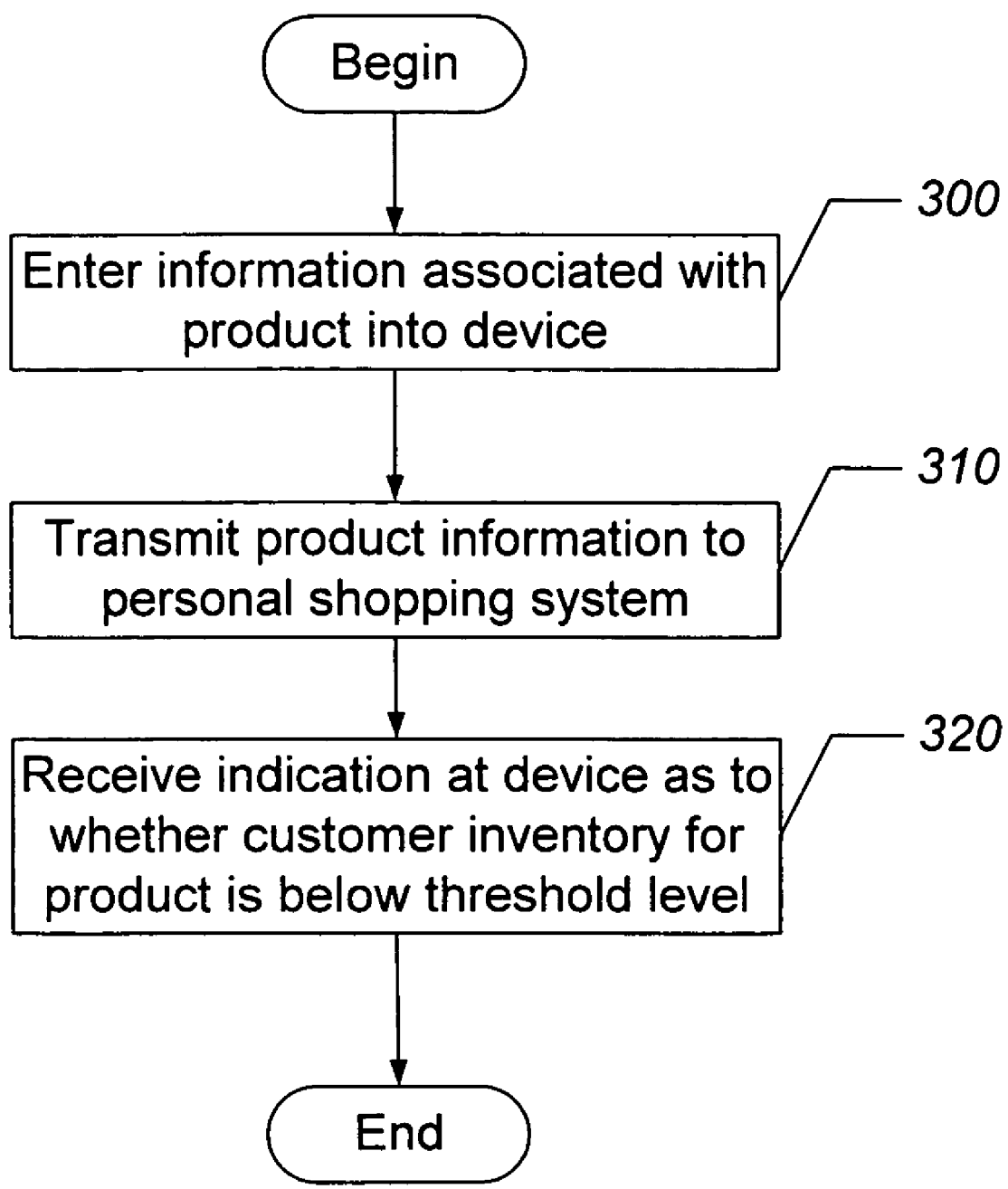

Referring now to FIGS. 3-5, flow charts of systems, methods and/or computer program products that facilitate personal shopping, according to some embodiments of the present invention, will now be described. Initially, customer information is stored in a product usage repository of a personal shopping system (Block 200). Customer information includes information about the customer, including personal information, preferences, etc., and also includes information about the products that the customer has purchased in the past and/or wishes to purchase in the future. Customer information may also include information (e.g., real-time information) about inventory levels of products at each customer's location (i.e., home, business, etc.).

Upon the occurrence of a customer-initiated, or other event, a shopping list is generated via the personal shopping system 100 using information stored within the product usage repository (Block 210) and transmitted to one or more product providers (Block 220). Exemplary customer initiated events that may cause a shopping list to be generated include, but are not limited to, consumption of products by a customer (Block 211, FIG. 4), in response to a customer entering product identification information into a device in communication with the communications network (Block 212, FIG. 4), in response to scanning a barcode associated with a product via a scanning device in communication with the communications network (Block 213, FIG. 4), in response to detecting an RFID tag identifier associated with the product via an RF antenna in communication with the communications network (Block 214, FIG. 4), in response to selecting a product displayed within a display screen of a device (e.g., a WebTV, etc.) in communication with the communications network (Block 215, FIG. 4), in response to a customer selecting ingredients that are required or that are to be avoided (Block 216, FIG. 4).

According to some embodiments of the present invention, the personal shopping system 100 may include an ingredients search engine. This search engine, will allow customers to generate a shopping list (Block 216, FIG. 4) by filtering out undesirable ingredients, such as ingredients to which they are allergic. For example, for a customer who cannot eat foods with wheat, the search engine can generate a list of food items that do not contain wheat and/or a list of stores where the customer can shop for non-wheat food items. In another scenario, a person who follows, say, the South Beach diet can search for food items that are part of the South Beach Diet.

According to some embodiments of the present invention, a customer may be allowed to override (i.e., edit, modify, etc.) the contents of a shopping list generated as described by the various methods above. According to some embodiments of the present invention, customers may be allowed to schedule the purchase of an item, whether it would be a repetitive task or an unique instance. For example, a customer may schedule the purchase of vanilla ice cream this week only (because of a house guest) or every two weeks, etc.

According to some embodiments of the present invention, a customer can specify purchasing decision logic and a shopping list may be generated in response to exercising this purchasing decision logic. For example, exemplary purchasing logic may include decision logic such as "buy alternate brand X if alternate brand X is at least $0.20 cheaper than a preferred brand", etc.

According to some embodiments of the present invention, customers can set the maximum limit they would pay for an item and product providers can submit bids for the some or all items on the list, as illustrated in FIG. 6. Alternatively, price limits are not set on the shopping list, but simply sent to different product providers. Whoever responds with the lowest prices for some or all items on the shopping list will become the selected vendor of choice for that consumer, as illustrated in FIG. 7.

According to some embodiments of the present invention, the personal shopping system 100 can monitor customer consumption of products and generate a shopping list when product inventory falls below a predetermined threshold (Block 211). For example, a customer can designate the personal shopping system to generate a shopping list when the customer's inventory of cans of tomato soup falls below a predetermined threshold. Customer product inventory can be monitored by the personal shopping system 100 in various ways. For example, the personal shopping system 100 can be notified each time a product is removed from the customer's refrigerator and/or pantry, using any of various well known technologies including, but not limited to, RFID technology, barcode scanning, etc.

According to some embodiments, a shopping list can be generated at the request of a customer by, for example, the customer identifying products to be added to a shopping list. Customer identification of products to be added to a shopping list may be performed in numerous ways. For example, a customer can enter information into a device, a customer can scan the barcode of a product, and/or a customer can utilize RFID technology (or some other technology) to identify a product.

When a shopping list is generated, the personal shopping system 100 transmits the shopping list with a request for information about the products on the list to one or more product providers (Block 220). Product providers wishing to participate, transmit the requested information about the products on the shopping list to the personal shopping system (Block 230). For example, a product provider informs the personal shopping system 100 about the price of each product on the shopping list, whether each product on the shopping list is available, and/or store location where the product can be picked up. The personal shopping system transmits this information to the customer for whom the shopping list was generated for (Block 240). According to some embodiments of the present invention, a customer can specify how products on a shopping list are to be delivered if the customer is not going to pick them up. For example, a customer can specify who/ what service will deliver them (e.g., the product provider, a delivery service such as Federal Express, UPS, DHL, etc.).

According to some embodiments of the present invention, a customer can enter product information into a device (Block 300) and transmit this information to the personal shopping system (Block 310). The personal shopping system then determines the customer's inventory level for the product. For example, if a customer is at the grocery store and wants to know whether he/she needs more tomato soup, the customer scans the barcode associated with a can of tomato soup via a device such as a cell phone, and the personal shopping system informs the customer virtually immediately whether the customer's inventory level for tomato soup is below a threshold.

According to some embodiments of the present invention, a customer can scan the barcode associated with a product in a store via a device, such as a cell phone, and the personal shopping system communicates with the store's product/price database, for example, via WIFI to check on pricing. Simultaneously, the customer can access the Product Usage Repository (FIG. 1, 104) and see whether the item scanned in the store is an item on his/her grocery list or whether that item is currently low.

According to some embodiments of the present invention, the personal shopping system 100 can be configured to receive sales or specials information from product providers. This information can be published periodically or as a unique event (such as liquidation sales), and alert customers when sales or specials are published. According to some embodiments of the present invention, alerts can be triggered and delivered to customer devices. For example, an ice cream special sale for Publix loyal patrons can be published by Publix and customers can be alerted by special ringtones or Publix earcon. This special notification and sales code can be delivered to the customer's PDA, cell phone, etc.

Computer program code for carrying out operations of FIGS. 3-5 may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Many variations and modifications can be made to the preferred embodiments without substantially departing from the principles of the present invention. All such variations and modifications are intended to be included herein within the scope of the present invention, as set forth in the following claims.

That which is claimed is:

1. A method of facilitating personal shopping, comprising:
generating a grocery shopping list for a customer via a personal shopping system connected to a communications network, wherein the personal shopping system includes purchasing decision logic defined by the customer that specifies a preferred brand for each grocery product, a purchase schedule for each grocery product, and a maximum amount the customer is willing to pay for each grocery product, wherein the shopping list identifies grocery products the customer wants to purchase based on the decision logic, wherein generating the shopping list is initiated automatically upon the occurrence of any of the following: as grocery products are consumed by the customer, in response to entering grocery product identification information into a device in communication with the communications network, in response to scanning a barcode associated with a grocery product via a scanning device in communication with the communications network, and in response to selecting a grocery product displayed within a display screen of a device in communication with the communications network;

transmitting the shopping list from the personal shopping system to one or more grocery product providers via the communications network with a request for information about each grocery product on the shopping list, wherein the information request for each grocery product on the shopping list includes grocery product price information, grocery product availability information, and grocery product location information;

receiving grocery product information at the personal shopping system for each item on the shopping list from one or more grocery product providers via the communications network; and transmitting the received grocery product information from the personal shopping system to a remotely located customer client device via the communications network, wherein the information includes grocery product price information, grocery product availability information, and grocery product location information.

2. The method of claim 1, wherein the device is selected from the group consisting of cell phones, PDAs, personal computers, internet video devices, and WebTVs.

3. The method of claim 1, wherein generating a grocery shopping list is responsive to detecting an RFID tag identifier associated with the grocery product via an RF antenna in communication with the communications network.

4. A personal shopping system, comprising:
a grocery product usage repository that contains customer information for a remotely located customer, and wherein the customer information includes information about grocery products previously purchased by the customer;
a processor;
memory coupled to the processor;
purchasing decision logic stored within the memory, wherein the purchasing decision logic is defined by the customer and specifies a preferred brand for each grocery product, a purchase schedule for each grocery product, and a maximum amount the customer is willing to pay for each grocery product;
a computer program code residing in the memory that, when executed by the processor, causes the processor to perform the following:
generate a grocery shopping list for the customer, wherein the grocery shopping list identifies grocery products the customer wants to purchase based on the decision logic, wherein generating the shopping list is initiated automatically upon the occurrence of any of the following: as grocery products are consumed by the customer, in response to entering grocery product identification information into a device in communication with the communications network, in response to scanning a barcode associated with a grocery product via a scanning device in communication with the communications network, and in response to selecting a grocery product displayed within a display screen of a device in communication with the communications network;

transmit the grocery shopping list to at least one grocery product provider via the communications network with a request for information about each grocery product on the shopping list, wherein the information request for each grocery product on the grocery shopping list includes grocery product price information, grocery product availability information, and grocery product location information;

receive grocery product information for each item on the grocery shopping list from one or more grocery product providers via the communications network; and transmit the received grocery product information to a remotely located customer client device via the communications network, wherein the information includes grocery product price information, grocery product availability information, and grocery product location information, and wherein the customer client device is a cell phone, a PDA, a personal computer, an internet video device, or a WebTV.

5. The personal shopping system of claim 4, further comprising computer program code that, when executed by the processor, allows a customer to modify a generated grocery shopping list.

\* \* \* \* \*